(12) United States Patent
Garabello et al.

(10) Patent No.: US 7,942,075 B2
(45) Date of Patent: May 17, 2011

(54) GEAR SELECTOR FORK FOR A MOTOR VEHICLE GEARBOX

(75) Inventors: Marco Garabello, Orbassano (IT); Valter Pastorello, Orbassano (IT); Andrea Piazza, Orbassano (IT)

(73) Assignee: C.R.F. Societa Consortile Per Azioni, Orbassano(Torino) (IT)

( * ) Notice: Subject to any disclaimer, the term of this patent is extended or adjusted under 35 U.S.C. 154(b) by 238 days.

(21) Appl. No.: 12/252,747

(22) Filed: Oct. 16, 2008

(65) Prior Publication Data

US 2009/0114050 A1 May 7, 2009

(30) Foreign Application Priority Data

Oct. 24, 2007 (EP) .................................... 07425666

(51) Int. Cl.
*F16H 63/32* (2006.01)
(52) U.S. Cl. .................................. 74/473.37; 74/473.36
(58) Field of Classification Search ............... 74/473.36, 74/473.37; 29/893.1, 525.14
See application file for complete search history.

(56) References Cited

U.S. PATENT DOCUMENTS

| 6,164,151 | A * | 12/2000 | Dutson et al. | 74/473.37 |
| 2007/0209466 | A1 * | 9/2007 | Garabello et al. | 74/473.37 |
| 2008/0314187 | A1 * | 12/2008 | Keller et al. | 74/473.36 |

FOREIGN PATENT DOCUMENTS

| EP | 0 967 419 A1 | 12/1999 |
| EP | 1 832 786 A1 | 9/2007 |
| WO | 2004/079232 A1 | 9/2004 |

* cited by examiner

*Primary Examiner* — Richard W Ridley
*Assistant Examiner* — Terence Boes
(74) *Attorney, Agent, or Firm* — Sughrue Mion, PLLC

(57) ABSTRACT

The gear selector fork comprises a body forming a pair of support plates having respective coaxial through-holes for supporting the fork slidably along a stationary rod of the gearbox, a pair of prongs fixed to the body and forming at their distal ends respective actuating portions able to operate a sliding coupling sleeve of the gearbox, and an actuating nose fixed to the body so as to impart to the fork the sliding movement along the stationary rod for engagement of the desired gear. The body and the prongs are formed so as to allow two forks with identical body and prongs to be mounted on the same stationary rod being superimposed at least partially in the direction of sliding along the stationary rod. The prongs are welded to one of the support plates of the body and extend on the same side as the zone where they are welded to the body, relative to the axis of the through-holes.

10 Claims, 3 Drawing Sheets

GEAR SELECTOR FORK FOR A MOTOR VEHICLE GEARBOX

BACKGROUND OF THE INVENTION

The present invention relates to a gear selector fork for a motor vehicle gearbox.

More particularly, the invention relates to a gear selector fork comprising:
- a body designed to support the fork slidably along a stationary rod of the gearbox;
- a pair of prongs fixed to the body and forming at their distal ends respective finger-like portions able to operate a sliding coupling sleeve of the gearbox; and
- an actuating nose fixed to the body so as to impart to the fork the sliding movement along the stationary rod for engagement of the desired gear.

A gear selector fork for a motor vehicle gearbox according to the preamble of independent claim 1 is known from European Patent Application EP-A-1 832 786 in the name of the Applicant. According to this known solution the fork body is formed so as to allow two forks which are identical (or, more specifically, differ only as regards the actuating nose) to be mounted on the same stationary rod, being superimposed at least partially in the direction of sliding along the rod. The body and the prongs may be formed as a single sheet-metal part obtained by means of blanking and bending. Alternatively, the body and the prongs may be formed as separate sheet-metal parts obtained by means of blanking and bending and fixed to each other by means of welding.

SUMMARY OF THE INVENTION

The object of the invention is to provide a gear selector fork for a motor vehicle gearbox which may be used to operate all the sliding coupling sleeves of a manual gearbox as well as all the sliding coupling sleeves of a robotized gearbox or a dual-clutch gearbox derivable or not from the same manual gearbox, which allows the axial dimensions of a set of two forks arranged on the same stationary rod to be kept to a minimum, which ensures compliance with the required dimensional and geometrical tolerances without the need to perform special machining and/or high-precision machining, which ensures the necessary stiffness, as well as the necessary mechanical strength and surface hardness in the zones which are subject to stress during operation, which offers a high degree of versatility in terms of application and which allows the costs for the blanking and bending equipment needed to produce the body and the prongs to be kept to a minimum.

This object and other objects are fully achieved according to the invention by means of a gear selector fork for a motor vehicle gearbox having the features set forth in independent claim 1.

Further advantageous features of the invention are specified in the dependent claims.

BRIEF DESCRIPTION OF THE DRAWINGS

The characteristics and advantages of the invention will emerge clearly from the detailed description which follows, provided purely by way of a non-limiting example with reference to the accompanying drawings in which.

DETAILED DESCRIPTION OF THE PREFERRED EMBODIMENTS

In the description and in the claims which follow, the term "longitudinal" is used to indicate a direction parallel to the axes of the stationary rod or rods on which the gear selector forks are slidably mounted, while the term "transverse" is used to indicate any direction perpendicular to the abovementioned longitudinal direction.

Figure 2:
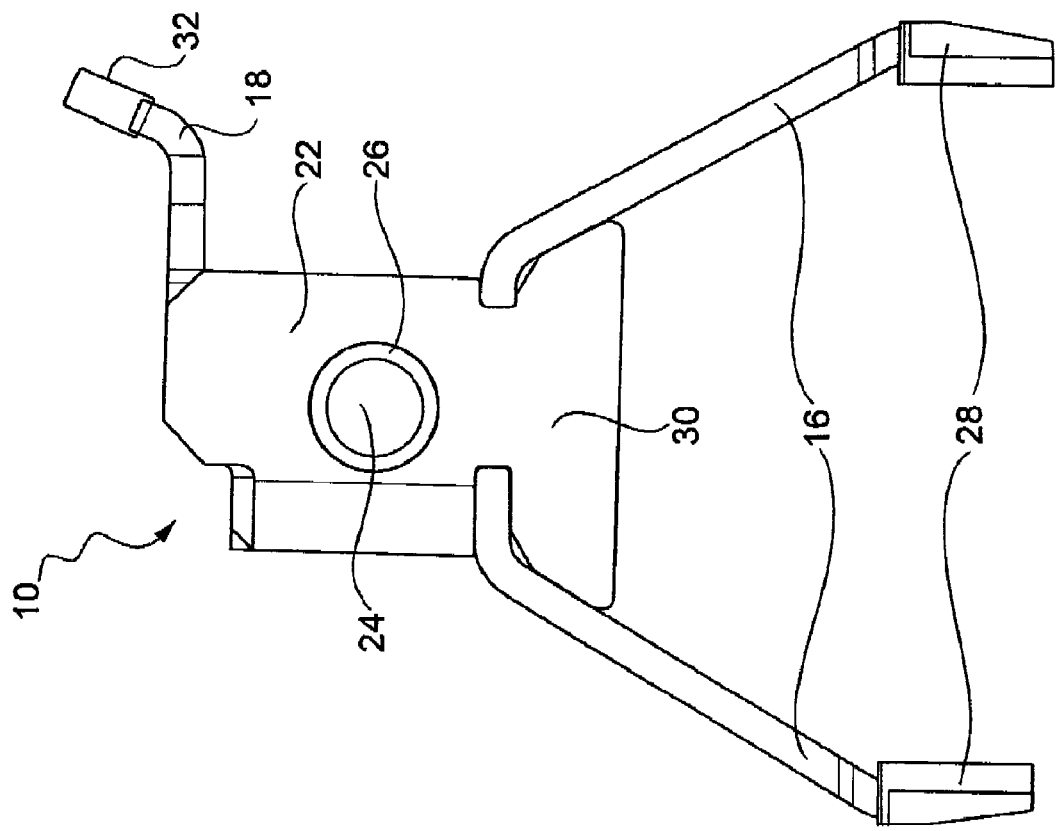
FIG. 2 is a front elevation view of the fork according to FIG. 1.
Figure 1:
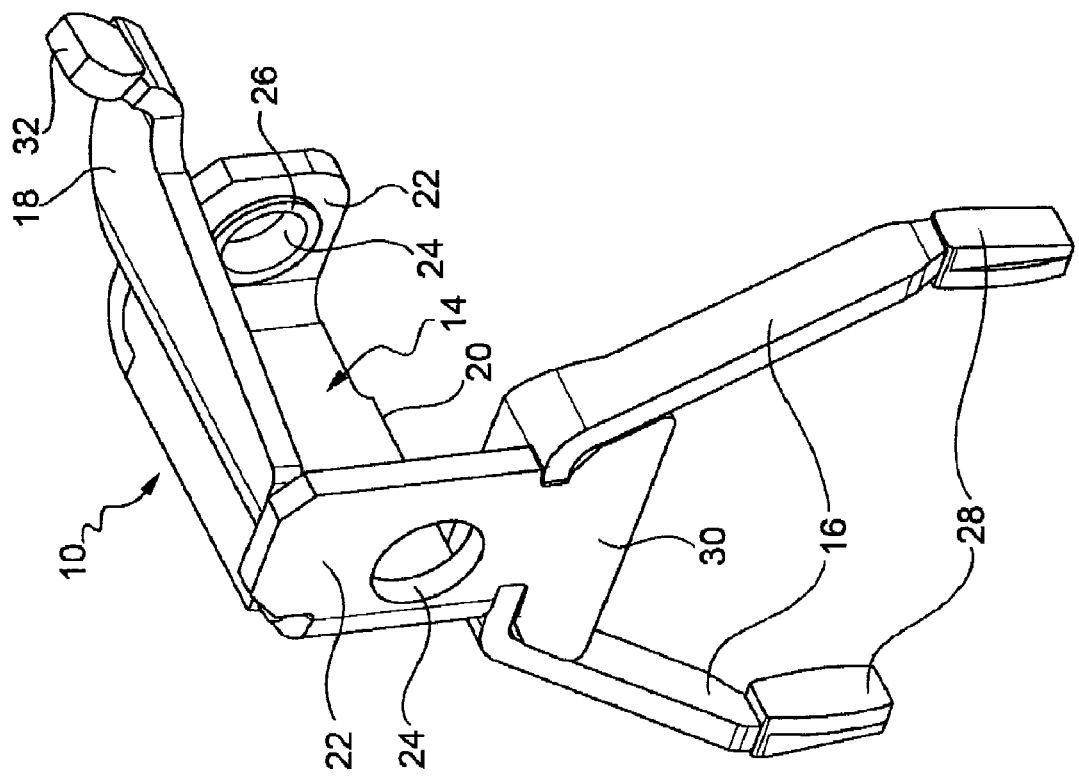
FIG. 1 is a perspective view of a gear selector fork for a motor vehicle gearbox according to the invention.

With reference initially to FIGS. 1 and 2, a gear selector fork for a motor vehicle gearbox is generally indicated 10 and comprises basically a body 14 which is arranged to support the fork slidably along a respective stationary rod 12 of the gearbox (shown in FIG. 5), a pair of prongs 16 fixed to the body 14 and an actuating nose 18 fixed to the body 14. The body 14, the prongs 16 and the actuating nose 18 are preferably made as separate sheet-metal parts which are obtained by means of blanking and bending and fixed to each other by means of welding.

The body 14 has a generally U-shaped configuration, with a central plate 20 and with a pair of support plates 22 which extend from the opposite longitudinal ends of the central plate 20, at right angles with respect to the latter, and lie in a transverse plane (or vertical plane from the standpoint of a person viewing FIGS. 1 and 2). The support plates 22 have respective coaxial through-holes 24 able to guide the fork 10 along the axis of the respective stationary rod, from hereon referred to as sliding axis. One of the two holes 24 is provided with a bush 26 preferably formed by means of plastic overmoulding and having the function of reducing friction and wear.

The two prongs 16 are advantageously formed as a single sheet-metal part welded to one of the two support plates 22, advantageously in the zone situated underneath the guide hole 24. The prongs 16 extend in a transverse plane, namely a plane parallel to the plane of the support plate 22 to which they are fixed, on the same side as the zone where they are fixed to the support plate 22, relative to the sliding axis defined by the two guide holes 24. The distal ends of the prongs 16 have a finger-like form so as to operate a sliding coupling sleeve of the gearbox (not shown) and advantageously are provided with a plastic coating 28, preferably formed by means of overmoulding and having the function of reducing wear.

Owing to the fact that the prongs 16 are welded to one of the support plates 22 underneath the axis of the guide hole 24 (sliding axis) instead of being welded or formed as one piece with the central plate 20 above that axis, as in the prior art discussed in the introductory part of the description, it is possible to reduce the length of the prongs and therefore obtain a fork having a generally more rigid structure.

As can be noted in particular in FIG. 2, the support plate 22 to which the prongs 16 are fixed forms a reinforcing lug 30 which extends between the two prongs 16 and is welded thereto. The reinforcing lug 30 is suitably formed so as to distribute uniformly the loads over the two prongs 16.

The actuating nose 18 is welded to the body 14, in particular both to the central plate 20 and to the two support plates 22, on the opposite side of the axis of the stationary rod 12 to the two prongs 16. The free end of the actuating nose 18 has a finger-like form for engagement inside a special seat of the gear lever (not shown) and is advantageously provided with a plastic coating 32 formed by means of overmoulding and having the function of reducing wear.

Figure 4:
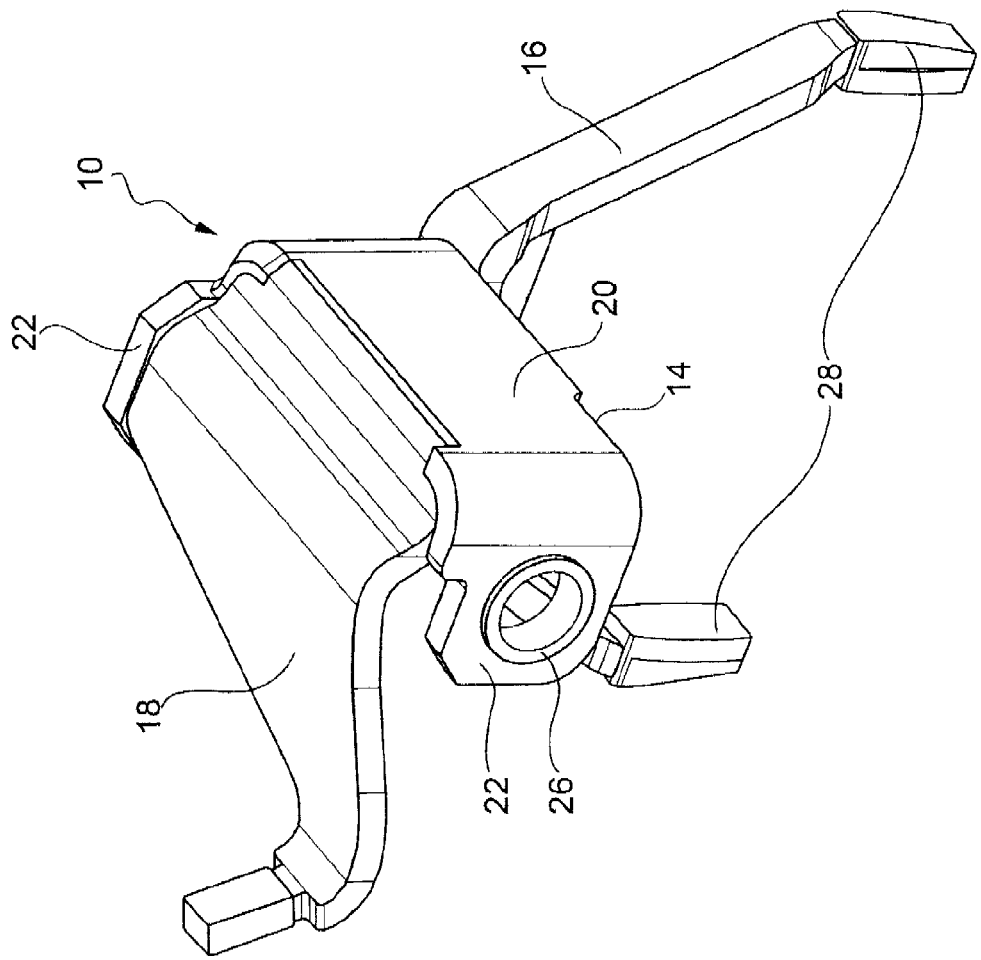
FIGS. 3 and 4 are perspective views of a gear selector fork according to the invention for a manual gearbox and for a dual-clutch gearbox, respectively.
Figure 3:
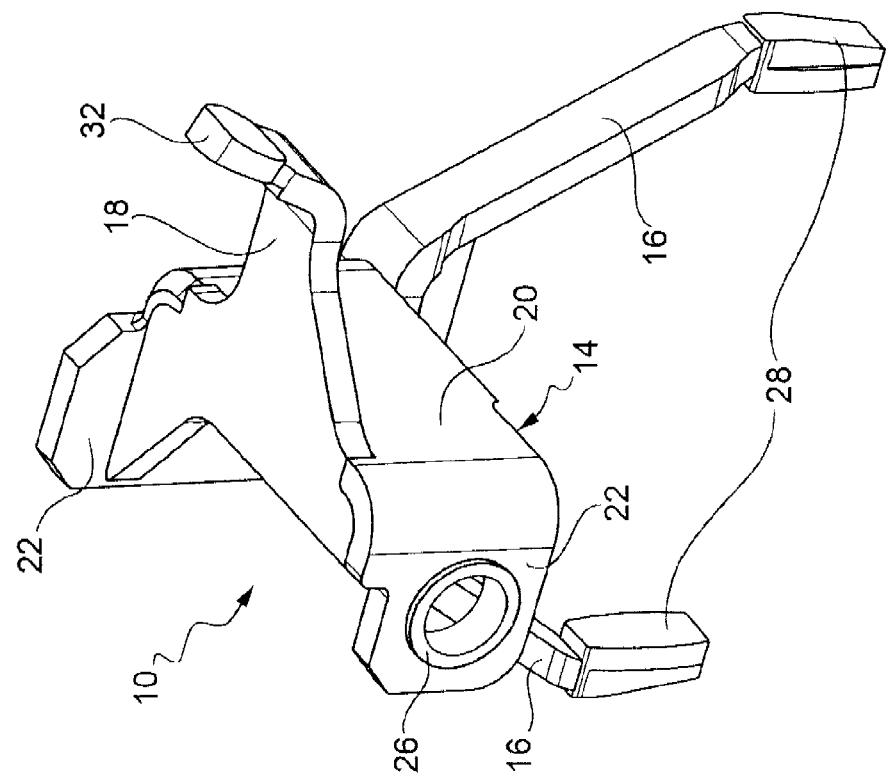

FIGS. 3 and 4 show the gear selector fork 10, in the configuration intended for a manual gearbox and in the configuration intended for a dual-clutch gearbox, respectively. As can be readily noted from a comparison of the two figures, the two forks have the same assembly formed by the body and the prongs and differ from each other only as regards the actuating nose. Such a modular structure of the fork clearly allows a reduction in the manufacturing costs since it is required to produce solely one type of fork body for all the gearboxes, it being sufficient to modify the actuating nose in order to adapt the fork to the type of gearbox for which it is intended.

Figure 5:
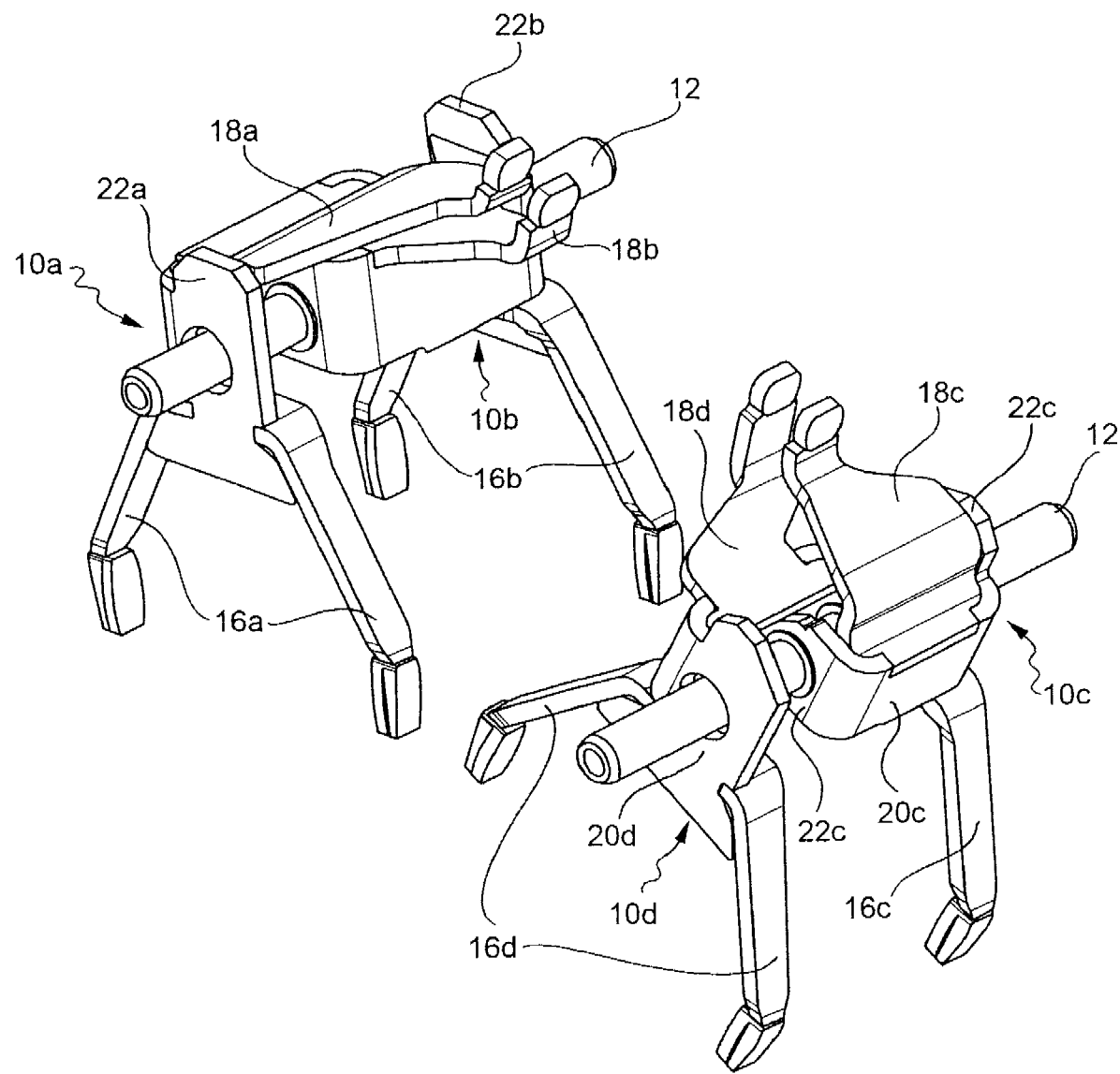
FIG. 5 is a perspective view which shows the arrangement of four gear selector forks according to the invention for a gearbox with six or seven forward gears plus reverse gear, which may be equally well of the single-clutch (manual or robotized) type or of the dual-clutch type.

FIG. 5 shows an example of an arrangement of the gear selector forks for a gearbox with six or seven forward gears plus reverse gear, which may be equally well of the single-clutch (manual or robotized) type or of the dual-clutch type. For the sake of convenience, each of the forks is denoted by a corresponding letter. The same is applicable for the fork components. More specifically, four selector forks 10a, 10b, 10c and 10d are envisaged, the fork 10a and the fork 10b being mounted on a first stationary rod 12, while the fork 10c and the fork 10d are mounted on a second stationary rod 12.

When it is used in a single-clutch manual gearbox, the fork 10a is arranged to control engagement of the first and second gear, the fork 10b is arranged to control engagement of the fifth and sixth gear, the fork 10c is arranged to control engagement of the third and fourth gear and the fork 10d is arranged to control engagement of reverse gear and seventh gear, if present. When used in a single-clutch robotized gearbox, the same association of the forks with the various gears described above for a single-clutch manual gearbox is applicable. When used in a dual-clutch gearbox, the fork 10a is arranged to control engagement of the first and third gear, the fork 10b is arranged to control engagement of the sixth and seventh gear, if present, the fork 10c is arranged to control engagement of the reverse gear and fifth gear and the fork 10d is arranged to control engagement of the second and fourth gear.

As can be readily seen from FIG. 5, owing to the particular form of the fork bodies, the forks may be mounted in pairs on the same stationary rod so as to be partially superimposed along the sliding axis. This is possible in particular since the central plate is arranged asymmetrically with respect to the plane of symmetry of the two prongs passing through the sliding axis, namely on the side of one of the two prongs relative to this plane. This partially superimposed arrangement of the forks allows the overall axial dimensions of the two forks to be limited, ensuring at the same time suitable mounting on the stationary rod, i.e. an adequate distance between the two support plates.

Still with reference to FIG. 5, it is possible to observe that the four forks have identical bodies and prongs and differ from each other solely as regards the actuating noses. In the example shown, the finger-like end portions of the actuating noses of the four forks are arranged in a single transverse engagement plane. The invention is, however, applicable also to the case where the finger-like end portions of the actuating noses of the four forks are arranged in different transverse engagement planes.

The actuating noses have the same form in the configuration for a single-clutch robotized gearbox and in the configuration for a dual-clutch gearbox, while they may vary slightly during conversion from the configuration for a single-clutch manual gearbox to the configuration for a dual-clutch gearbox.

Moreover, the forks of each pair are mounted on the same stationary rod in a mirror-image arrangement, i.e. with the prongs arranged on longitudinally opposite sides along the stationary rod and with the central plates arranged on transversely opposite sides with respect to the stationary rod.

It is clear, however, that the forks could also be arranged singly instead of in pairs. Moreover, the forks could be arranged either singly or in pairs, all on a single stationary rod or on several stationary rods.

Obviously, the principle of the invention remaining unchanged, the embodiments and constructional details may be widely varied with respect to those described and illustrated purely by way of a non-limiting example.

What is claimed is:

1. A gear selector fork for a motor vehicle gearbox, comprising:
   a body including first and second support plates having first and second through-holes, respectively, for supporting the fork slidably along a stationary rod of the gearbox, wherein each of said first and second support plates extends in a respective transverse plane and wherein an axis of the first through-hole coincides with an axis of the second through-hole,
   a pair of prongs, welded to the first support plate and extended downwardly therefrom, distal ends of the prongs having respective actuating portions configured to operate a sliding coupling sleeve of the gearbox, and
   an actuating nose fixed to the body so as to impart to the fork the sliding movement along the stationary rod for engagement of a gear,
   the body and the prongs being formed so as to allow two forks with identical body and prongs to be mounted on the same stationary rod being superimposed at least partially in the direction of the sliding movement along the stationary rod,
   wherein the prongs are welded to the first support plate in a zone situated underneath the first through-hole and extend downwardly in another transverse plane, parallel to or coincident with the transverse plane of the first support plate, underneath the first through-hole.

2. Fork according to claim 1, wherein the body, the prongs and the actuating nose are formed by respective sheet-metal parts obtained by means of blanking and bending and joined together by means of welding.

3. Fork according to claim 1, wherein the body has a generally U-shaped configuration, with a central plate from the opposite ends of which the support plates extend at right angles.

4. Fork according to claim 1, further comprising at least one wear-resistant bush mounted in a respective through-hole.

5. Fork according to claim 4, wherein said at least one bush is obtained by means of plastic overmoulding.

6. Fork according to claim 1, wherein the actuating portions of the prongs are provided with a wear-resistant coating.

7. Fork according to claim 1, wherein the actuating nose forms at its distal end a finger-like actuating portion provided with a wear-resistant coating.

8. Fork according to claim 6, wherein the wear-resistant coating of the actuating nose is obtained by means of plastic overmoulding.

9. Fork according to claim 7, wherein the wear-resistant coating of the prongs is obtained by means of plastic overmoulding.

10. Fork according to claim 1, wherein the support plate to which the prongs are fixed forms a reinforcing lug which extends between the two prongs and is welded thereto.

\* \* \* \* \*